United States Patent [19]
Smith et al.

[11] B 3,988,405

[45] Oct. 26, 1976

[54] PROCESS FOR FORMING THIN WALLED ARTICLES OR THIN SHEETS

[75] Inventors: Robert D. Smith, Raleigh, William B. Upchurch, Wake Forest, both of N.C.

[73] Assignee: Corning Glass Works, Corning, N.Y.

[22] Filed: Mar. 29, 1973

[21] Appl. No.: 346,044

[44] Published under the Trial Voluntary Protest Program on Jan. 28, 1975 as document No. B 346,044.

Related U.S. Application Data

[63] Continuation-in-part of Ser. No. 132,192, April 7, 1971, abandoned, which is a continuation-in-part of Ser. No. 772,053, Oct. 30, 1968, abandoned.

[52] U.S. Cl. .................................. 264/63; 65/18; 106/39.5; 264/61
[51] Int. Cl. ............................................. C04b 35/64
[58] Field of Search ............... 264/63, 61; 106/39.5; 260/29.6 TA; 65/18

[56] References Cited
UNITED STATES PATENTS

| | | | |
|---|---|---|---|
| 2,486,410 | 11/1949 | Howatt | 264/63 |
| 2,582,993 | 1/1952 | Howatt | 264/63 |
| 2,795,564 | 6/1957 | Conn | 260/29.6 TA |
| 2,966,719 | 1/1961 | Park | 264/63 X |
| 3,004,197 | 10/1961 | Rodriquez | 317/258 |
| 3,163,841 | 12/1964 | Willett | 338/292 |
| 3,195,030 | 7/1965 | Herczog | 317/258 |
| 3,423,517 | 1/1969 | Arrhenius | 264/63 X |
| 3,472,803 | 10/1969 | Andrews | 106/39 X |
| 3,574,029 | 4/1971 | Ehre | 264/63 X |

*Primary Examiner*—Robert F. White
*Assistant Examiner*—Thomas P. Pavelko
*Attorney, Agent, or Firm*—Walter S. Zebrowski; Clarence R. Patty, Jr.

[57] ABSTRACT

A process for forming thin walled articles or thin sheets by applying a casting composition to a substrate, drying the composition on the substrate, and separating the article so formed from the substrate, said casting composition consisting essentially of (a) at least about 95 percent of a combination of three constituents: (1) from 65–92 percent by weight of glass, glass-ceramic, or sinterable ceramic particles having a mean particle size of from 0.2 to 12 microns and a maximum particle size of about 100 microns; (2) from about 5 to 35 percent by weight of an aqueous acrylic polymer emulsion binder containing from about 40 to about 60 percent by weight of water and; (3) up to about 15 percent by weight of water, and (b) the balance being a small amount of one or more surfactants to inhibit foaming and to promote dispersion of the particulate material in the binder. The composition has excellent properties for forming thin walled articles and thin films which are flexible and have sufficient green strength so that they can be handled easily. Upon sintering, the flexible articles or films form dense glass, glass-ceramic, or sintered ceramic articles or sheets, which sheets, for example, form excellent substrates or dielectrics for electrical capacitors or other electrical devices.

19 Claims, No Drawings

PROCESS FOR FORMING THIN WALLED ARTICLES OR THIN SHEETS

CROSS REFERENCE TO RELATED APPLICATIONS

This application is a continuation-in-part of application Ser. No. 132,192, filed Apr. 7, 1971; now abandoned which in turn was a continuation-in-part of application Ser. No. 772,053, filed Oct. 30, 1968, now abandoned.

BACKGROUND OF THE INVENTION

1. Field of the Invention

This invention relates to compositions for forming flexible articles, sheets or films of glass, glass-ceramic, or ceramic particulate material useful in the manufacture of thin dielectric films or layers.

2. Prior Art

The casting of suspensions of ceramic material to form layers or sheets which are then sintered to produce ceramic substrate material is known in the art. Heretofore, however, the resulting substrate material tended to contain voids which would reduce the insulating or dielectric efficiency of the material. Where the substrate is to be used in an electronic device, such as a capacitor, lack of voids and very high dielectric efficiency are of the utmost importance.

More specifically, where the substrate material is to be utilized in forming what is referred to as a "stacked" capacitor, it is important that the material have good flow characteristics when the stack of capacitor elements is subjected to pressure. In this technique, a plurality of thin green films of, for example, the ceramic material are coated with the necessary conductive patterns and contacts and are arranged in layers. The resulting stack is then subjected to heat and pressure to sinter the green films and form an integral layered article. If the ceramic material does not flow properly under pressure the resulting device will have voids which reduce the insulating nature of the layers and can lead to failure of the device. The development of capacitors having greater capacitance per volume has necessitated the formation of thinner green films than were heretofore required. To achieve such capacitance densities, films as thin as a few mils are necessary. Although films as thin as about one mil can be produced in accordance with the teachings in U.S. Pat. No. 2,966,719 issued to J. L. Park, Jr., the binder utilized in this patent requires the use of organic solvents which are disadvantageous in that they present health and fire hazards and require the use of additional equipment for ventilation purposes.

Some prior art slip compositions can be thinned by the addition of water thereto and therefore are not subject to the aforementioned disadvantages associated with organic solvents. However, the viscosities of those compositions cannot be lowered to the extent necessary for forming thin green films of adequate strength. For example, the slip composition taught in U.S. Pat. No. 3,472,803 issued to P. W. Andrews et al., which includes an aqueous latex emulsion, is useful for the formation of microcircuit substrates having thicknesses greater than about 20 mils. When a sufficient amount of water is added to the Andrews et al. slip composition to form films having thicknesses between about 15 and 20 mils, the resultant green films possess only a minimum of strength. To form films having a thickness up to 15 mils utilizing the Andrews et al. type of binder, such a large amount of water must be added to the slip composition that the resultant green films possess insufficient strength to be handled for subsequent operations.

Another prior art composition for casting ceramic articles is taught in U.S. Pat. No. 2,952,877 issued to J. L. Park, Jr. This patent teaches a water-soluble volatilizable polymeric organic binder such as polyvinyl alcohol. In accordance with the teachings of this latter mentioned Park, Jr. patent, inorganic particulate materials mixed with polymeric organic binder, plasticizer, wetting agent and water to form a heavy paste which is used in the extrusion of relatively thick dielectric bodies such as the 0.040 inch slab specifically mentioned therein. Attempts to thin the Park, Jr. composition by the addition of sufficient water to decrease the viscosity thereof to a value sufficiently low to permit the formation of green films thinner than about 15 mils met with the same problem that was encountered in the attempts to use the Andrews et al. composition. That is, green films having thicknesses up to about 15 mils formed from compositions taught in the Andrews et al. and the latter mentioned Park, Jr. patents possessed insufficient strength when sufficient water was added to the batch to permit the casting of such thin films.

According to the present invention, thin, flexible films of glass, glass-ceramic, or sinterable ceramic particles can be formed which yield excellent dielectric substrate material upon sintering.

BRIEF DESCRIPTION OF THE INVENTION

Briefly, the present invention comprises a process for forming thin walled articles or thin sheets by applying a casting composition to a substrate, drying the casting composition on the substrate to provide a flexible article having green strength sufficiently high to permit handling, and separating the flexible article from the substrate, said casting composition consisting essentially of (a) from at least about 95 percent by weight of a combination of (1) about 65–92 percent by weight of a particulate glass, glass-ceramic, or sinterable ceramic material, (2) from about 5–35 percent by weight of an aqueous acrylic polymer emulsion binder containing from about 40 percent to about 60 percent by weight of water, and (3) up to about 15 percent by weight of water, and (b) a sufficient amount of at least one surfactant to reduce foaming and to promote dispersion of the particulate material in the binder. The present invention also comprises the article formed by the above method, which article is suitable for making a dielectric substrate material for electrical capacitors or other electronic devices.

The particulate material of the present invention has a mean particle size of from about 0.2 to 12 microns. Substantially all of the particles have a maximum particle size of up to about 100 microns and preferably up to about 20 microns. The particles may be glass, glass-ceramic, or sinterable ceramic materials. Glass-ceramics are crystallizable vitreous materials that are at least partly crystallized by heat treating under specified conditions and, after crystallization take on the properties of ceramic materials. The terms "glass" and "sinterable ceramic" are used in their usual, art acepted, senses. Typical glass ceramic materials are disclosed in U.S. Pat. No. 3,195,030, Herczog et al., herein incorporated by reference. Mixtures of glass, glass-ceramics, and sinterable ceramics may also be used.

For purposes of simplicity, the term "ceramic" as hereinafter used in this specification and claims is hereby defined to mean glass or glass-ceramics or sinterable ceramics or mixtures thereof.

It is to be noted that although the present invention is particularly suitable for forming thin walled articles and thin films having superior green strength in thicknesses up to about 15 mils, thick walled articles and thick films having high green strength may also be formed.

The composition of a particularly useful ceramic material, specifically a glass-ceramic material, for forming flexible, thin films, capable of being converted into excellent capacitor dielectric material is as follows:

TABLE I

| Constituent | % by Weight |
|---|---|
| BaO | 13.0 |
| SrO | 9.0 |
| PbO | 18.0 |
| $Nb_2O_5$ | 48.0 |
| $SiO_2$ | 7.0 |
| $Al_2O_3$ | 2.0 |
| $B_2O_3$ | 2.5 |
| $Cu_2O$ | 0.5 |
|  | 100.0% |

Batch compositions for the above ceramic, referred to as Type A and other suitable particulate materials appear in Table II following.

emulsions are described in U.S. Pat. No. 2,795,564, Conn et al., herein incorporated by reference.

In addition to the three primary components (i.e., ceramic, binder and water) the composition also contains small amounts of at least one surfactant material to defoam and assist in the dispersion of the particulate material in the binder. Up to about 5 percent of a surfactant for dispersing the material and up to about 5 percent of a surfactant for defoaming are satisfactory. The composition may also contain up to about 3 percent of a wetting agent, up to about 5 percent of a thickening agent and up to about 5 percent of a hygroscopic agent to adjust the film forming properties of the composition. The total surfactant content in the composition is preferably below about 5 percent.

DETAILED DESCRIPTION OF THE INVENTION

Considering the compositions of the present invention in more detail, a particulate ceramic material is prepared by first melting and then rapidly quenching it by rolling between water-cooled aluminum oxide clad stainless steel rollers to form flakes approximately 1.5 to 1.9 mils in thickness. This material is then finely ground by ball milling in a water slurry and then dried in warm air. Particulate material suitable for the present invention may be formed in any suitable manner known in the art.

A casting slip is then prepared by mixing the following ingredients in a ball mill for 16 hours to insure that a homogeneous mixture is formed.

TABLE II

Batch Compositions

Parts by Weight

| Ceramic Type | $BaCO_3$ | $SrCO_3$ | PbO | $Nb_2O_5$ | $SiO_2$ | CuO | $TiO_2$ | $Al_2O_3$ | ZnO | $CaCO_3$ | $CaF_2$ | $(NH_4)_2 CrO_4$ | $Bi_2O_3$ | $SnO_2$ | $B_2O_3$ |
|---|---|---|---|---|---|---|---|---|---|---|---|---|---|---|---|
| A | 166.5 | 126.0 | 178.0 | 484.0 | 76.0 | 3.5 | — | 19.0 | — | — | — | — | — | — | 25.0 |
| B | 278.2 | — | — | — | 34.0 | — | 102.4 | 32.0 | 4.0 | 28.4 | — | — | — | — | — |
| C | 294.5 | — | — | — | 34.0 | — | 102.8 | 32.0 | — | — | 3.3 | 8.0 | — | — | — |
| D | 260.0 | — | — | — | 34.0 | — | 88.3 | 32.0 | — | — | — | — | 30.0 | 18.0 | — |
| E | 298.2 | — | — | — | — | — | 99.2 | — | — | 40.8 | — | — | — | — | 51.8 |
| F | 535.0 | — | 67.2 | — | 47.2 | — | 241.6 | 32.0 | — | — | — | — | — | — | — |
| G | 32.5 | 24.4 | 36.4 | 94.4 | 10.8 | 0.7 | — | 11.8 | — | — | — | — | — | — | 3.6 |
| H | 166.5 | 126.0 | 178.0 | 483.0 | 76.0 | 3.5 | — | 19.0 | — | — | — | 2.0 | — | — | 25.0 |

The binder material is an aqueous emulsion, having a pH between about 8 and 10, containing a water insoluble interpolymer formed with (a) units having carboxylate groups derived from a polymerizable carboxylic acid having alpha, beta-unsaturation in a vinylidene group, (b) units from at least one neutral-free radical-polymerizable ester having a vinylidene group attached to the functional group, which ester by itself yields a soft linear polymer, and (c) units from at least one neutral polymerizable monovinylidene compound which by itself yields a hard polymer. The polymer

| Material | Wt. % Range |
|---|---|
| Ceramic | 65% to 92% |
| Binder (including water) | 5% to 35% |
| Water | up to 15% |
| Dispersant | up to 5% |
| Defoamer | up to 5% |
| Wetting Agent | up to 5% |
| Thickening Agent | up to 5% |
| Hygroscopic Agent | up to 5% |

The binder materials used in the compositions are aqueous acrylic polymer emulsions having a pH between about 8 and 10 and containing a water insoluble interpolymer. The water insoluble interpolymer is formed with (a) units having carboxylate groups derived from a polymerizable carboxylic acid having alpha, beta-unsaturation in a vinylidene group, (b) units from at least one neutral-free radical-polymerizable ester having a vinylidene group attached to the functional group which ester by itself yields a soft linear polymer and (c) units from at least one neutral polymerizable monovinylidene compound which by itself yields a hard polymer. In one embodiment a blend of a plurality of such emulsions is employed, one, in major proportion, containing a non-ionic surfactant or emulsifier to assist in dispersing the interpolymer, and another, in minor proportion, free from a non-ionic emulsifier.

As polymerizable alpha, beta-unsaturated monovinylidene carboxylic acids, there are used acrylic acid, methacrylic acid, or other alpha-substituted polymerizable acrylic acid, or itaconic acid. The preferred acids are methacrylic and acrylic. In place of the free acids there may be used water-soluble salts thereof, including the ammonium salts and the alkali metal salts such as lithium or potassium carboxylates. The salts may be preformed or they may be formed in the dispersion system. The necessary and important consideration is that carboxylate groups be supplied to enter into the interpolymer. The best way to ensure that carboxylate groups do in fact enter into the copolymer chain is to use one of the above acids.

The useful monomers which by themselves yield soft polymers are neutral compounds which form a separate phase with the aqueous solutions used in forming the dispersions, which contain per molecule one vinylidene group attached to a functional substituent or an activating substituent with a double bond, which polymerize through the vinylidene group with the aid of a free radical catalyst, and which yield solid polymers having a $T_i$ value below 15°–20°C.

As polymerizable, neutral, monomeric monovinylidene esters which form soft, solid polymers in the presence of peroxidic catalysts, there may be used any primary and secondary alkyl acrylate, with alkyl substituents of up to about eighteen or more carbon atoms, primary or secondary alkyl methacrylates with alkyl substituents of five to eighteen or more carbon atoms, or other monovinylidene compounds as defined above which are polymerizable below 80°C. with free radical catalysts to form soft solid polymers. The preferred monovinylidene compounds are the stated acrylates and methacrylates and of these the most practical esters are those with alkyl groups of not over 12 carbon atoms.

The preferred monomers which by themselves yield soft polymers may be represented by the following formula:

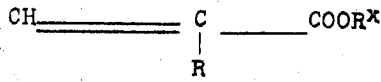

where R is hydrogen or the methyl group and $R^x$ represents, when R is methyl, a primary or secondary alkyl group of 5 to 18 carbon atoms, or, when R is hydrogen, an alkyl group or not over 18 carbon atoms, preferably about 2 to 12 carbon atoms.

Typical compounds coming within the above definition are methyl acrylate, ethyl acrylate, propyl acrylate, isopropyl acrylate, butyl acrylate, isobutyl acrylate, sec.-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec.-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, etc.

As polymerizable monovinylidene monomers which by themselves form hard polymers, there may be used alkyl methacrylates having alkyl groups of not over four carbon atoms, also tert-amyl methacrylate, tert-butyl or tert-amyl acrylate, cyclohexyl acrylate or methacrylate, acrylonitrile, or methacrylonitrile. The monomers yield polymers under the influence of free radical catalysts, particularly peroxidic catalysts, which polymers are generally regarded as hard, and when free of any appreciable content of monomer, have $T_i$ values, i.e., transition temperature values, above about 20°C. The $T_i$ value referred to is the transition temperature or inflection temperature which is found by plotting the modulus of rigidity against temperature. A convenient method of determining modulus of rigidity and transition temperature is described by I. Williamson, British Plastics 23, 87–90, 102 (September 1950). Hard polymers have also been defined as those having softening points above 55°C. or brittle points above about 5°C. These are all different appraisals of the force required to produce a given deformation in a body in a given time and to evaluate the aggregate of various properties encompassed within the term of hardness.

Preferred monomers which by themselves form hard polymers may be represented by the following formula:

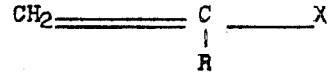

wherein R is hydrogen or the methyl group and wherein X represents —CN, or ester-forming group —COOR', wherein R' is cyclohexyl; or, when R is hydrogen, R' is a tert-alkyl group of four to five carbon atoms; or, when R is methyl, R' is an alkyl group of one to four carbon atoms. Some typical examples of these have already been named. Other specific compounds are methyl methacrylate, ethyl methacrylate, propyl methacrylate, isopropyl methacrylate, butyl methacrylate, sec.-butyl methacrylate, and tert.-butyl methacrylate.

In order to prepare interpolymers having the requisite properties there must be used at least one of each of the above three classes of polymerizable materials. The unsaturated carboxylic acid or salt is interpolymerized in a proportion usually between about 0.5 percent and 2.6 percent by weight, preferably between 0.8 percent and 2 percent of the interpolymer, the proportion being selected for a given combination of polymerizable materials to provide the properties of stability, viscosity, and freeze-tolerance without the development of water-sensitivity.

Useful proportions of monomers characterized by forming soft and hard polymers respectively vary with the choice of these monomers. For this reason the required proportions are best defined functionally. There are considerable variations in softness and hardness produced by different members of the respective classes of polymerizable monomers. Thus, if a monomer is selected which gives a greater degree of softness than another, a larger proportion of monomer forming a hard polymer will be used to attain a given level of toughness for the final interpolymer. Conversely, if a monomer yielding a relatively harder and, perhaps more brittle polymer is selected, then a larger proportion of a monomer yielding soft polymers will be used, or a monomer which gives by itself an even softer polymer will be selected.

Some typical proportions, by weight, which provide a desirable balance of properties in films of the interpolymers, which include 0.5 to 2.5 percent by weight of the acid or salt are as follows: ethyl acrylate-methyl methacrylate, 6:4 to 7:3; ethyl acrylate-styrene, 4:1 to 7:3; ethyl acrylate-acrylonitrile, 4:1 to 3:1; propyl acrylate-acrylonitrile, 7:3 to 3:1; isopropyl acrylate-acrylonitrile, 9:1 to 5:1; isopropyl acrylate-methyl methacrylate, 6:1 to 4:1; propyl acrylate-methyl methacrylate, 1:1 to 2:3; butyl acrylate-acrylonitrile, 7:3 to 3:2; butyl acrylate-methyl methacrylate, about 1:1, isobutyl acrylate acrylonitrile 4:1 to 7:3; isobutyl acrylate-methyl methacrylate, 3:2 to 1:1; sec.-butyl acrylate-acrylonitrile, 5:1 to 4:1; sec.-butyl acrylate-methyl methacrylate, 7:3 to 3:2; 2-ethylhexyl acrylate-styrene, 1:1 to 2:3; 2-ethylhexyl acrylate-acrylonitrile, 2:1 to 3:2; 2-ethylhexyl acrylate-methyl methacrylate, 1:1 to 2:3; 2-ethylhexyl acrylate-butyl methacrylate, 1:9 to 1:20; 2-ethylhexyl acrylate-isobutyl methacrylate, 3:7 to 1:4; ethyl acrylate-tert.-butyl methacrylate, 9:1 to 5:1; dodecyl acrylatemethyl methacrylate, 2:3 to 1:3, hexyl methacrylate-butyl methacrylate, 1:1, etc. It will be seen that to provide useful interpolymers the proportion of monomer forming soft polymers to monomers forming hard polymers varies from about 9:1 to about 1:20. In every case, of course, the ultimate interpolymer will be formed with about 0.5 percent to about 2.5 percent of the carboxylate. For the preferred situation in which the interpolymer is prepared from an ester of acrylic acid and a non-tertiary alkanol of not over 12 carbon atoms and methyl methacrylate (together with acid), the ratios vary from about 6:1 to 1:3. These ratios are also preferred for other acrylic materials.

The emulsifiers, which have been found to be needed to disperse or emulsify the present combinations of monomers and to maintain the formed interpolymers in stable suspension, are non-ionic surface active agents. These are composed of a hydrophobic or hydrocarbon portion and a hydrophilic portion. The latter is a polyether chain usually terminated with an alcoholic hydroxyl group of sufficient size to render the agents water-soluble. When polar groups form a relatively large proportion of the monomer combination, it is preferred that the non-ionic agents have 20 to 50 ether groups in the hydrophilic portion. When the combination of polymerizable monomers has a relatively high hydrocarbon content, best results are usually obtained with non-ionic agents having a relatively small proportion of ether groups. These principles will guide in the selection of the most effective emulsifiers foro the particular monomers chosen for the preparation of suspensions of resulting interpolymers.

Typical emulsifiers which may be used include alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl and the like mercaptans or with alkyl thiophenols having alkyl groups of six to fifteen carbon atoms; ethylene oxide derivatives of long-chained carboxylic acids, such as lauric, myristic, palmitic, oleic, and the like or mixtures of acids such as found in tall oil; ethylene oxide condensates of long-chained alcohols such as octyl, decyl, lauryl, or catyl alcohols; ethylene oxide derivatives of etherified or esterified polyhydroxy compounds having a hydrophobic hydrocarbon chain, etc.

The amounts of polymerization emulsifier or emulsifiers required vary primarily with the concentration of monomers to be handled and to a minor extent with choice of emulsifiers, monomers, and monomer proportions. Generally, the amount of emulsifying agent is between 2 and 12 percent of the mixture of the monomers and is preferably 4 to 7 percent of this weight. If the dispersion is to contain a relatively low concentration of interpolymer somewhat more than the minimum emulsifying agent indicated by the above rule may prove desirable. In such case the concentration of emulsifying agent in the aqueous solution may desirably be at least 1 percent of this solution and may be as much as about 7 percent of the weight of the aqueous solution thereof.

In some cases it has been found desirable to use a blend of binder emulsions comprising an emulsion of the type described above and an emulsion of the same type but not containing the non-ionic emulsifier. One suitable binder material herein referred to as Binder "A", consists essentially of 61 percent ethyl acrylate, 37 percent methyl methacrylate, and 2 percent acrylic acid in percent by weight. Another suitable binder material herein referred to as Binder "B", consists essentially of 60 percent ethyl acrylate, 38 percent methyl methacrylate, and 2 percent acrylic acid in percent by weight. Binder A and Binder B are available commercially as Rhoplex B-60A and Rhoplex AC-61, respectively.

Of the surfactants added to control foaming and to assist in dispersion of the solid particles, one particularly preferable surfactant to inhibit the foaming is a 50 percent solution of a ditertiary acetylene glycol in ethylene glycol which, for example, is commercially available as Surfynol 104E. Other surfactants suitable for use as defoamers are, dimethyl polysiloxane, tributyl phosphate, and sec.-octyl alcohol. The preferred surfactant for use as a dispersing agent is a 25 percent aqueous solution of a sodium salt of a carboxylated polyelectrolyte, which, for example, is available commercially as Tamol 731. Tamol 850, a 30 percent aqueous solution, is also useful. Other surfactants suitable for use as dispersing agents are sodium hexametaphosphate, sodium silicate sodium carbonate (50–50 weight percent mixture), and sodium silicate.

In forming flexible films using the above-described composition a continuous film of the slip is cast onto a suitable release film such as a silicone treated paper belt. A film having a thickness of about 1.8 mils is satisfactory for many purposes. The preferred mode of casting is to draw a moving belt of the temporary substrate up through a container holding the slip composition. As will be understood, the temperature of the slip may be any suitable temperature for the particular slip composition used, such, for example, as ambient room temperature. The time during which the slip is applied to the blet is, of course, determined solely by the belt speed. The thickness of the suspension carried on the belt may then be controlled by varying the belt speed, the suspension viscosity, or the angle of incline of the belt as it passes through the slip. It is understood that the viscosity of the slip is a fixed and measurable parameter once the slip is prepared. Reference is made to U.S. Pat. No. 1,458,591 issued to C. P. Olson and U.S. Pat. No. 3,659,990 issued to Cato, Jr. et al., each of which show an apparatus for film making. These patents are incorporated herein by reference.

The coated suspension is then dried by passing over a heated section of a film forming table. Drying can also be accomplished at ambient room temperature if desired, however, the drying time will obviously be longer. Drying time and temperatures are not critical parameters in the practice of the present invention. The dried film is separated from the release belt and reeled between paper webs at the discharge end of the casting machine.

When the films are to be used in the fabrication of a multilayered capacitor, the procedure is begun by placing a first sheet on a vacuum table and screening an electrode pattern onto the sheet. Other layers are then similarily prepared and stacked.

After the stacking is completed, the assembly is placed in a furnace to burn out the volatile material and produce the sintered laminated device. The burnout and firing may be conducted at about 250°C. for about 3 hours, and then about 350°C. for about 7 hours. The stack is then sealed by heating above 700°C. One example of a suitable method for forming a stacked capacitor is taught in U.S. Pat. No. 3,604,082 issued to R. D. McBrayer, F. I. Peters and R. D. Smith. This patent is incorporated herein by reference.

The following examples illustrate the present invention:

EXAMPLE 1

To produce 1.9 mil film, with the above specified Type A ceramic of means particle size of 3 microns, at a release belt velocity of approximately 100 linear feet per hour, with the belt being pulled up through the slip substantially vertically, the following composition is used:

| Material | Type | Wt. % |
| --- | --- | --- |
| Ceramic | A | 79.95 |
| Binder | Blend* | 10.21 |
| Dispersant | Tamol 731 | 0.40 |
| Defoamer | Surfynol 104E | 0.36 |
| Water | Deionized | 9.08 |

*Consists of a 6:1 weight ratio blend of an aqueous emulsion binder containing Binder "A" and Binder "B" respectively. The weight percent includes about 53% water and 47% resin solids.

Ceramic of approximately 8 to 9 micron average particle size is charged into a ball mill with the balance of the constituents such that the mill is about six times the volume of the charge. To this is added a charge of aluminum oxide ($Al_2O_3$) grinding medium, commercially known as 13/16 inches Burundum, in a ratio of 2.5 pounds of grinding medium per pound of ceramic. The mill is rotated at 60 rpm for 16 hours and the resulting slip separated from the grinding medium and placed in a jar of about 3 to 4 times the slip volume. These jaws in turn are rolled on a 16 rpm mill for 16 hours minimum to de-air the slip, after which time the green film is prepared, as described above.

EXAMPLE 2

To produce 2 mil green film with ceramic of mean particle size of 6 microns, at a release belt velocity of approximately 100 linear feet per hour, with the belt being pulled up through the slip substantially vertically, the following composition is used:

| Material | Type | Wt. % |
| --- | --- | --- |
| Ceramic | J | 72.85 |
| Binder | Blend* | 17.15 |
| Dispersant | Tamol 731 | 0.50 |
| Defoamer | Surfynol 104E | 0.45 |
| Water | Deionized | 9.05 |

*Consists of a 6:1 weight ratio blend of an aqueous emulsion binder containing Binder "A" and Binder "B" respectively. The weight percent includes about 53% water and 47% resin solids.

Ceramic type J consists essentially of about 39 percent $SiO_2$, 50 percent $PbO$, 6 percent $K_2O$, 3 percent $Na_2O$, 1 percent $Li_2O$, and 1 percent $Sb_2O_3$, in weight percent. The ceramic is charged into a mill in the form of flakes, one inch and smaller, along with the balance of the constituents, the mill being about 4 times the volume of the charge. To this is added a charge of aluminum oxide grinding medium, 13/16 inches Burundum, in a ratio of 3.4 pounds of grinding medium per pound of ceramic. The mill is rotated at 60 rpm for 6 hours and the resulting slip separated from the grinding medium and placed in a jar of about three to four times the slip volume. These jars in turn are rotated on a 16 rpm mill for 16 hours minimum to de-air the slip, after which time the green film is prepared, as described above.

EXAMPLES 3 AND 4

Examples 1 and 2 were repeated, but alumina particles of like size were substituted for the ceramics of those examples, to form flexible films.

Compositions of the type set out in Table III were also prepared and were found to provide satisfactory substrate materials. Suitable surfactants for use as wetting agents to adjust adhension of the green film to the release paper may be ethyl lactate, nonylphenoxypolyethanol, alkylaryl sulfonate, polyethylenesorbitanmonolaurate, and polyethylene glycol t-dodecylthioether. A particularly suitable surfactant for use as a wetting agent is a compound that is commercially available as Aerosol GPG.

Suitable thickening agents may be hydroxyethylcellulose, potassium fluosilicate, aluminum silicate, and ammonium nitrate. A particularly suitable thickening agent is polyacrylic acid commercially available as Acrysol A-1.

TABLE III

| Example No. | Particulate Material | Binder Blend* | Batch Ingredient (Wt. %) Dispersant | Foam Depressant | Water | Hygroscopic Agent | Surfactant | Thickening Agent |
|---|---|---|---|---|---|---|---|---|
| | Type A | | Tamol 731* | Surfynol 104E* | | Triethanol Amine | Aerosol GPG* | Acrysol A-1* (Ammoniated to control pH between about 9 and 10) |
| 5 | 83.25 | 6.85 | 0.42 | 0.38 | 9.10 | | | |
| 6 | 73.78 | 17.80 | 0.37 | 1.35 | 6.70 | | | |
| 7 | 81.47 | 12.75 | 0.44 | 0.41 | 4.25 | 0.68 | | |
| 8 | 77.80 | 14.04 | 0.40 | 0.37 | 7.02 | | 0.37 | |
| 9 | 81.83 | 10.20 | 0.36 | 0.33 | 5.85 | 0.55 | | 0.88 |
| 10 | 77.66 | 9.91 | 1.16 | 0.71 | 10.56 | | | |
| 11 | 79.95 | 10.21 | 0.40 | 0.36 | 9.08 | | | |
| | Type B | | Tamol 850* | | | | | |
| 12 | 77.09 | 11.22 | 0.94 | 0.80 | 9.95 | | | |
| | Type C | | | | | | | |
| 13 | 77.09 | 11.22 | 0.94 | 0.80 | 9.95 | | | |
| | Type D | | | | | | | |
| 14 | 77.09 | 11.22 | 0.94 | 0.80 | 9.95 | | | |
| | Type E | | | | | | | |
| 15 | 76.68 | 11.22 | 0.96 | 0.81 | 10.14 | | | |

*As heretofore described.

Although the present invention has been described with respect to specific details of certain embodiments thereof, it is not intended that such details be limitations upon the scope of the invention except insofar as set forth in the following claims.

We claim:

1. A process for forming a thin unsupported sheet having a thickness of up to about 15 miles and having a green strength sufficiently high to permit manual handling which, upon sintering, is capable of providing a thin, non-porous article comprising the steps of
   applying a casting composition to a substrate,
   drying said casting composition on said substrate,
   separating said flexible article from said substrate to form an unsupported flexible article having green strength sufficiently high to permit handling, and
   sintering said flexible article, said casting composition consisting essentially of
   A. at least about 95 percent by weight of a combination of the following three constituents:
      1. from about 65 to 92 percent by weight of ceramic material having a mean particle size of from 0.2 to 12 microns and the particles having a maximum size of about 100 microns,
      2. from about 5 to 35 percent by weight of an aqueous acrylic polymer emulsion binder composed of a water-insoluble interpolymer made up of
         a. monomeric units having carboxylate groups from at least one polymerizable alpha, beta-unsaturated vinylidene carboxylic acid,
         b. monomeric units from at least one polymerizable ester which by itself forms soft polymers and which is selected from the class consisting of esters of acrylic acid and primary alkanols from 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and
         c. monomeric units from at least one polymerizable monovinylidene compound which by itself forms a hard polymer and which is selected from the group consisting of alkyl methacrylates in which the alkyl group has 1 to 4 carbon atoms, tert.-amyl methacrylate, tert.-butyl acrylate, cyclohexyl acrylate, and cyclohexyl methacrylate, the monomeric carboxylate units constituting between 0.5 to 2.5 percent of the interpolymer, the ratio of the monomeric units forming soft polymers to the monomeric units forming a hard polymer being from about 9:1 to about 1:20, said emulsion containing about 40 to 60 percent by weight of water, and
      3. an effective amount up to about 15 percent by weight of water, and
   B. an effective amount up to 10 percent by weight of at least one surfactant.

2. The process of claim 1 wherein said particles have a maximum size of about 20 microns.

3. The process of claim 1 wherein said ceramic material is glass.

4. The process of claim 1 wherein said ceramic material is a glass-ceramic.

5. The process of claim 4 wherein said glass-ceramic is a niobate glass-ceramic.

6. The process of claim 1 wherein the aqueous emulsion of said binder has a pH within the range 8–10.

7. The process of claim 1 wherein said surfactant comprises an effective amount up to 5 percent by weight of said casting composition of a dispersant and an effective amount up to 5 percent by weight of said casting composition of a defoaming agent.

8. The process of claim 1 wherein said monomeric units forming the soft polymers have a $T_i$ value below about 15°–20°C, and said monomeric units forming the hard polymer having a $T_i$ value above about 20°C.

9. The process of claim 8 wherein said monomeric units forming soft polymers have the formula:

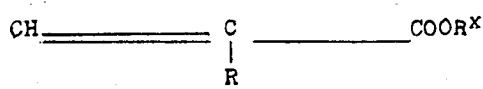

where R is a member selected from the group consisting of hydrogen and a methyl group and $R^x$ represents, when R is methyl, a member selected from the group consisting of primary and secondary alkyl groups of 5 to 18 carbon atoms, and $R^x$ represents, when R is hydrogen, an alkyl group of up to 18 carbon atoms, and the monomeric units forming a hard polymer are represented by the formula:

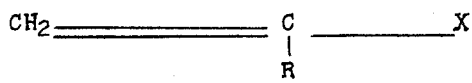

wherein R is a member selected from the group consisting of hydrogen and a methyl group and wherein X represents a member selected from the group of —CN, and —COOR', wherein R' is a member selected from the group consisting of a cyclo hexyl group; when R is hydrogen, R' is a tertalkyl group of four to five carbon atoms; and, when R is methyl, R' is an alkyl group of one to four carbon atoms.

10. The process of claim 9 further comprising the step of sintering the flexible article separated from said substrate.

11. The process of claim 10 wherein said ceramic material is a glass-ceramic.

12. The process of claim 11 wherein said surfactant comprises an effective amount up to 5 percent by weight of said casting composition of a dispersant and an effective amount up to 5 percent by weight of said casting composition of a defoaming agent.

13. The process of claim 10 wherein said substrate is a movable belt and wherein the step of applying comprises drawing said belt through a container holding said casting composition.

14. The process of claim 1 wherein said monomeric units having carboxylate groups are selected from the group consisting of acrylic acid, methacrylic acid, alpha-substituted acrylic acids, and itaconic acid.

15. The process of claim 1 wherein said composition further comprises an effective amount up to 3 percent by weight of a wetting agent.

16. The process of claim 1 wherein said composition further comprises an effective amount up to 5 percent by weight of a thickening agent.

17. The process of claim 1 wherein said composition further comprises an effective amount up to 5 percent by weight of a hygroscopic agent.

18. The process of claim 1 wherein said surfactant is present in an effective amount up to 5 percent by weight.

19. The process of claim 1 wherein said substrate is a movable belt and wherein the step by applying comprises drawing said belt through a container holding said casting composition.

* * * * *